No. 761,642. Patented June 7, 1904.

UNITED STATES PATENT OFFICE.

GEORGE F. ATWOOD, OF WAKEFIELD, MASSACHUSETTS, ASSIGNOR TO PRIMARY POWER COMPANY, OF WAKEFIELD, MASSACHUSETTS.

EXCITING FLUID FOR ELECTRICAL BATTERIES.

SPECIFICATION forming part of Letters Patent No. 761,642, dated June 7, 1904.

Application filed October 3, 1903. Serial No. 175,608. (No specimens.)

*To all whom it may concern:*

Be it known that I, GEORGE F. ATWOOD, a citizen of the United States, residing at Wakefield, in the county of Middlesex and State of Massachusetts, have invented new and useful Improvements in Compositions for Exciting Fluids for Electrical Batteries, of which the following is a specification.

My invention relates to a composition for use in the cell of electrical batteries in which the positive electrode is immersed. It is especially adapted for use in batteries of the Bunsen type, and its great value resides in its economy and efficiency. The electrode immersed in the composition is preferably carbon.

In preparing the solution in which the positive or carbon electrode is immersed I add seven pounds of nitrate of sodium to sixteen pounds of nitric acid of a strength corresponding to 30° Baumé. To this I add gradually and while stirring four and one-half pounds of sulfuric acid at 25° Baumé. I then take fourteen gallons of water and add sulfuric acid thereto until its specific gravity reaches 1.2 in the cold and mix this with one hundred and twenty-six pounds of nitric acid at 30° Baumé. This solution I mix with the other solution prepared as above, and the resulting mixture after cooling is ready for use.

Nitrate of potassium might replace the nitrate of sodium in the compound above described.

I am not the first to use, broadly, the ingredients above described; but I am the first to employ the specific proportions mentioned, and these I find give superior results.

Having thus described my invention, what I claim is—

A composition for use in the cell of electrical batteries in which the positive element is immersed, consisting of nitrate of sodium seven pounds, nitric acid one hundred and forty-two pounds, and sufficient sulfuric acid to make the specific gravity of fourteen gallons of water 1.2, as specified.

In testimony whereof I have hereunto set my hand in presence of two subscribing witnesses.

GEORGE F. ATWOOD.

Witnesses:
THOMAS E. TURPIN,
N. C. HEALY.